(12) United States Patent
Kondo

(10) Patent No.: US 6,917,013 B2
(45) Date of Patent: Jul. 12, 2005

(54) COPYING WELDING EQUIPMENT

(75) Inventor: Akihiro Kondo, Kanagawa (JP)

(73) Assignee: Kabushiki Kaisha Kokuho, Kanagawa (JP)

(*) Notice: Subject to any disclaimer, the term of this patent is extended or adjusted under 35 U.S.C. 154(b) by 154 days.

(21) Appl. No.: 10/399,262

(22) PCT Filed: Sep. 11, 2001

(86) PCT No.: PCT/JP01/07886

§ 371 (c)(1),
(2), (4) Date: Apr. 16, 2003

(87) PCT Pub. No.: WO02/32611

PCT Pub. Date: Apr. 25, 2002

(65) Prior Publication Data
US 2004/0026390 A1 Feb. 12, 2004

(30) Foreign Application Priority Data
Oct. 16, 2000 (JP) ........................... 2000-315706

(51) Int. Cl.$^7$ ................................. B23K 9/12
(52) U.S. Cl. ................................. 219/124.31
(58) Field of Search ............... 219/124.31, 124.1; 228/8–11, 25, 27, 45, 102, 103

(56) References Cited

U.S. PATENT DOCUMENTS

| 1,884,826 | A | * | 10/1932 | Peck et al. ............ 219/124.31 |
| 3,596,048 | A | * | 7/1971 | Maeda et al. .......... 219/124.31 |
| 3,764,777 | A | * | 10/1973 | Sakabe et al. ......... 219/124.31 |
| 5,543,600 | A | * | 8/1996 | Ozamoto et al. ....... 219/124.34 |

FOREIGN PATENT DOCUMENTS

| JP | 59-110498 | | 6/1984 |
| JP | 61001472 A | * | 1/1986 |
| JP | 62124074 A | * | 6/1987 |
| JP | 07040047 A | * | 2/1995 |
| JP | 08071791 A | * | 3/1996 |

* cited by examiner

Primary Examiner—Kevin P. Kerns
(74) Attorney, Agent, or Firm—Sughrue Mion, PLLC

(57) ABSTRACT

In the tracking welder, left and right side wheels are supported rotatably by a pair of bearing units that are pivotally attached on a carriage, and this carriage is provided with a driving source for running the carriage, a transmission system for transmitting a rotational motion of the driving source to the left and right side wheels, a welding torch, a sensor for detecting a route to be welded, a track-controlling motor to be rotate in forward and backward directions in response to a detection signal of the sensor, and a steering system for turning the bearing units in an amount corresponding to a rotational amount of the track-controlling motor. According to this tracking welder, it is possible to automatically perform various kinds of welding including not only fillet welding of a corner between horizontally placed steel plate and web plate erected on the steel plate, but also butt welding of steel plates, for example.

4 Claims, 14 Drawing Sheets

COPYING WELDING EQUIPMENT

TECHNICAL FIELD

This invention relates to a welding apparatus and more particularly to a tracking welder of which a carriage is so structured as to travel along a predetermined welding line together with a welding torch mounted thereon.

BACKGROUND ART

When fillet welding of a corner of metallic plates is carried out by running the carriage mounted with the welding torch, the traveling direction of the carriage should be controlled so that the welding torch may travel along the welding line.

FIG. 14 illustrates an example of the conventional tracking welders. In a case of fillet welding of the corner made by a virtually horizontally placed steel plate (a) and a steel web plate (b) erected on the steel (a), a self-travelable carriage (d) mounted with a welding torch (c) is placed on the steel plate (a), and the welding of the corner is automatically performed with the welding torch (c) at the same time of running the carriage (d) along a tracking face, that is the web plate (b).

The carriage (d) is mounted with a front tracking roller (e) projecting toward the tracking face (the web plate) (b) and a rear tracking roller (f) projecting at a long distance as compared with the front tracking roller e, and by running the carriage (d) in direction (g) slightly inclined toward the tracking face (the web plate) (b), the front tracking roller (e) and the rear tracking roller (1) become to be always contact with the tracking face (the web plate) (b), and thus a distance between the welding torch (c) and the corner is kept constant.

However, as for the above-mentioned conventional tracking welder, while it is possible to automatically weld the corner between the horizontally placed steel plate (a) and the web plate (b), there is a problem in that such the machine is not available in a case the web plate (b) does not exist (in a case of butt welding, for example).

Moreover, even when welding the corner by utilizing the erected wall (b), there still remains a problem of limitation in the traveling directions of the carriage (d), and it is impossible to perform welding by running the carriage in the reverse direction from the arrow (g).

Furthermore, since the carriage (d) gradually approaches the web plate (b) while traveling, the wheels of the carriage (d) tend to be pushed back by the tracking rollers (e) and (f), and always slip in the lateral direction, thereby causing the strong frictional resistance and making the carriage (d) not to travel so smoothly. Further, since the two tracking rollers (e) and (f) press the web plate (b) while the carriage (d) is traveling, there is another problem of a danger in that the web plate (b) pushed by the rollers (e) and (f) might come off from the steel plate (a) in a case where the web plate (b) is temporally tacked on the steel plate (a), and it becomes subject to solve these problems.

DISCLOSURE OF THE INVENTION

The present invention has been achieved in view of the aforementioned problems in the conventional arts, and it is an object to provide a tracking welder, which is widely applicable in the welding of various parts other than just a corner, which is able to perform welding even when the traveling direction of the carriage is reversed, and further, which can perform welding smoothly along the predetermined route without causing compulsive slipping to the wheels of the carriage while it is traveling.

The very investors found out that the above objects are attainable by setting a steering system to a carriage and controlling it, and thus comes to accomplish the present invention through their diligent scrutiny.

The tracking welder according to the present invention is characterized by supporting left and right side wheels by a pair of bearing units attached pivotally on a carriage, and providing a driving source for running the carriage, a transmission system for transmitting a rotational motion of the driving source to the left and right side wheels, a welding torch, a sensor for detecting a welding line, a track-controlling motor to be rotate in forward and backward directions in response to a detection signal of the sensor, and a steering system for turning the bearing units in an amount corresponding to a rotational amount of the track-controlling motor on the carriage.

Further, in the first preferred embodiment of the tracking welder in the present invention, the transmission system is characterized by comprising a hollow outer cylinder rotatably supported on the carrier to be transmitted with the rotational motion of the driving source, an intermediate shaft disposed in the hollow of the outer cylinder and connected with axles of the wheels through universal joints at both ends thereof, and a transmission pin passing through an oval hole formed in the intermediate shaft and engaged to the outer cylinder at both ends thereof, as the second preferred embodiment of the tracking welder in the present invention, the steering system is characterized by comprising a pair of arm bolts protruding from outer faces of the respective bearing units, a connection bar pivotally connected with one pair of arm bolts at both ends thereof, and a lever secured on an output shaft of the track-controlling motor and engaging with one of the arm bolts at a free end thereof, and as the third preferred embodiment of the tracking welder in the present invention, it is characterized by further providing a suction system for attracting the carriage toward a carriage-running face so as to enable the carriage to travel on the running face.

Furthermore, another tracking welder of the present invention is a welding apparatus for welding works made of non-magnetic metal with each other, and is characterized by comprising a carriage traveling in a state of holding a welding torch, and a suction system for attracting the carriage toward the works so as to enable the carriage to travel, and the suction system is provided with a flat base made of magnetic metal, and having a carriage-running face and a traveling route-setting means, a flexible suction cup formed with an aperture and fitted on reverse side of the carriage-running face of the base in a state of directing the aperture toward the opposite direction of the carriage-running face, a suction source for sucking air in the suction cup, and a magnet disposed on the carriage for preventing the carriage to fall.

In the tracking welder of the present invention, the rotational motion of the driving source is transmitted to the wheels through the transmission system, thereby running the carriage. When the sensor mounted on the carriage detects displacement of the welding torch from the predetermined welding line, the tracking-controlling motor rotates in response of the detection signal from the sensor, and the bearing units turn in accordance with the rotational amount of the track-controlling motor through the steering system, whereby the direction of the wheels is corrected according to the turn of the bearing units, and the carriage comes to travel along the predetermined route, in such manner the welding is completed without deviating from the predetermined welding line.

Further, in the tracking welder of the first preferred embodiment in the present invention, having the above described construction, the outer cylinder supported by the carriage rotates by the rotation of the primary travel drive rotates, and the rotation of the outer cylinder is transmitted to the intermediate shaft by way of the transmission pin, whereby the rotation of the intermediate shaft is now transmitted to the wheels through the universal joints, and thus the carriage comes to travel smoothly.

Furthermore, in the tracking welder of the second preferred embodiment in the present invention, provided with the aforementioned construction, when the sensor detects the displacement amount of the welding torch from the welding line while the carriage is traveling, the track-controlling motor rotates on basis of on the detection amount, the lever fixed on the output shaft of the track-controlling motor presses one of the arm bolts, thereby transmitting this force to another arm bolt through the connection bar, and in this way, both arm bolts come to turn in the same amount. Also, the bearing units coupled with the arm bolt turn together with the wheels, and the direction of the wheels is automatically corrected, whereby the carriage comes to travel along the predetermined route.

As already mentioned, in the case where transmission system of driving force is provided with the a hollow outer cylinder rotatably supported on the carrier to be transmitted with the rotational motion of the driving source, the intermediate shaft disposed in the hollow of the outer cylinder and connected with the axles of the wheels through the universal joints at both ends thereof, the direction of the wheels can be changed without being impeded by the intermediate shaft because the universal joints are provided between the intermediate shaft and respective wheels, and the intermediate shaft is disposed so as to be possible to swing around the transmission pin serving as a fulcrum.

Further, in the tracking welder of the third preferred embodiment in the present invention, which is further provided with the suction system for attracting the carriage toward the carriage-running face so as to enable the carriage to travel on the running face, it is possible to hold the carriage on the carriage-running face, thereby enabling the welder to perform butt welding of works made of non-magnetic metal and multi-layer welding at a corner of works, for example, and application fields of this tracking welder come to be increased.

Furthermore, in the second tracking welder of this invention, which is most suitable for butt welding of non-magnetic metal works, the base is adsorbed on the works by sucking air in the suction cup using the suction source of the suction system, thereby completing setting for the works, on the other hand, the adsorption state of the base on the works is released by stopping the operation of the suction source of the suction system and introducing air into the suction cup, whereby the base becomes removable. In this manner, arrangements and withdrawals as a whole become easier and possible to be completed in a short time. In a preferred embodiment of the second tracking welder in the present invention, the setting of the route for the carriage becomes available simple.

BEST MODE FOR CARRYING OUT THE INVENTION

The present invention will be described in detail on basis of embodiments thereinafter, however this invention is not limited to these embodiments.

EXAMPLE 1

An embodiment of the tracking welder according to this invention is shown in FIG. 1 to FIG. 8.

Figure 1:
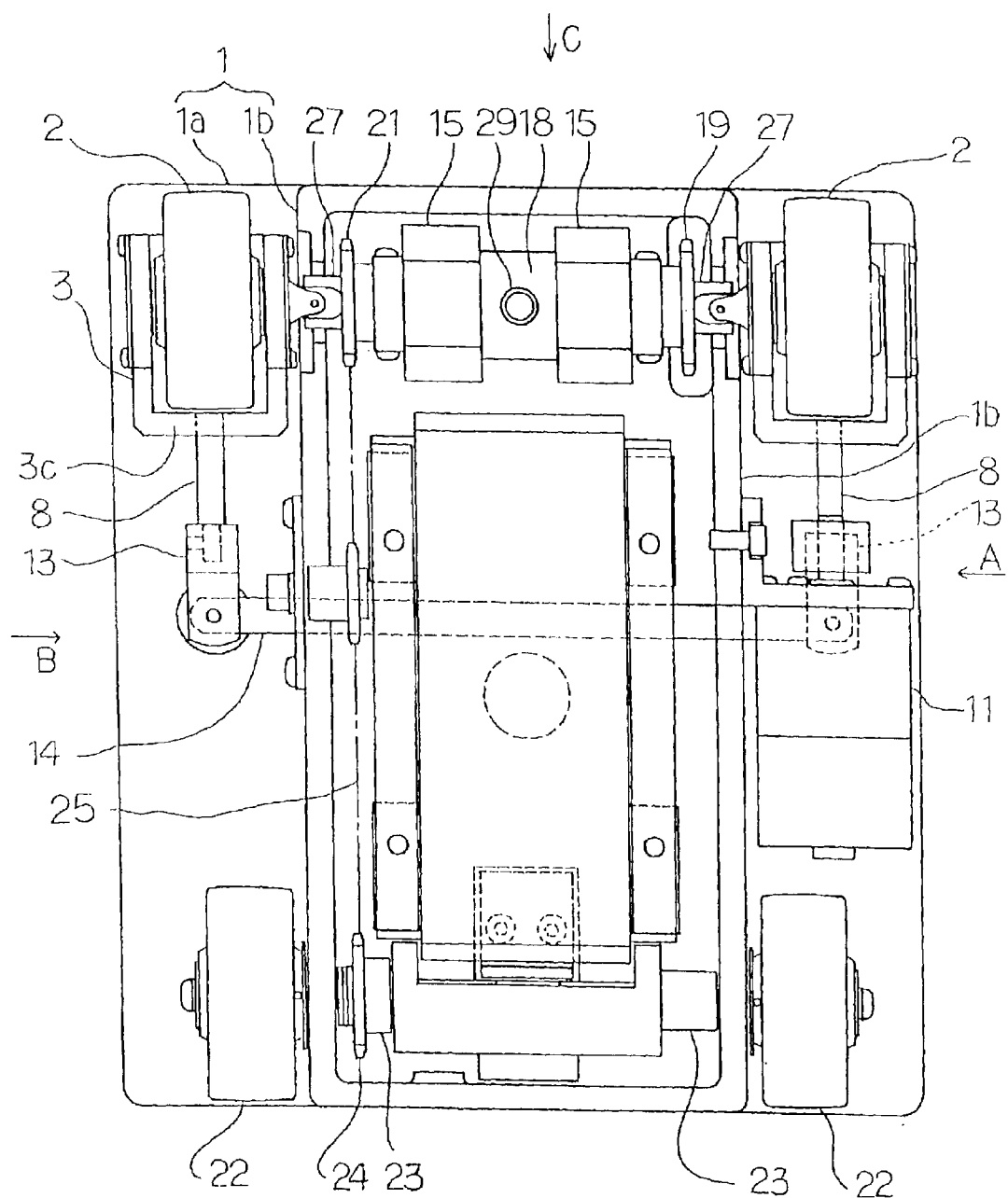
FIG. 1 is a bottom view illustrating an embodiment of the tracking welder according to this invention.
Figure 4:
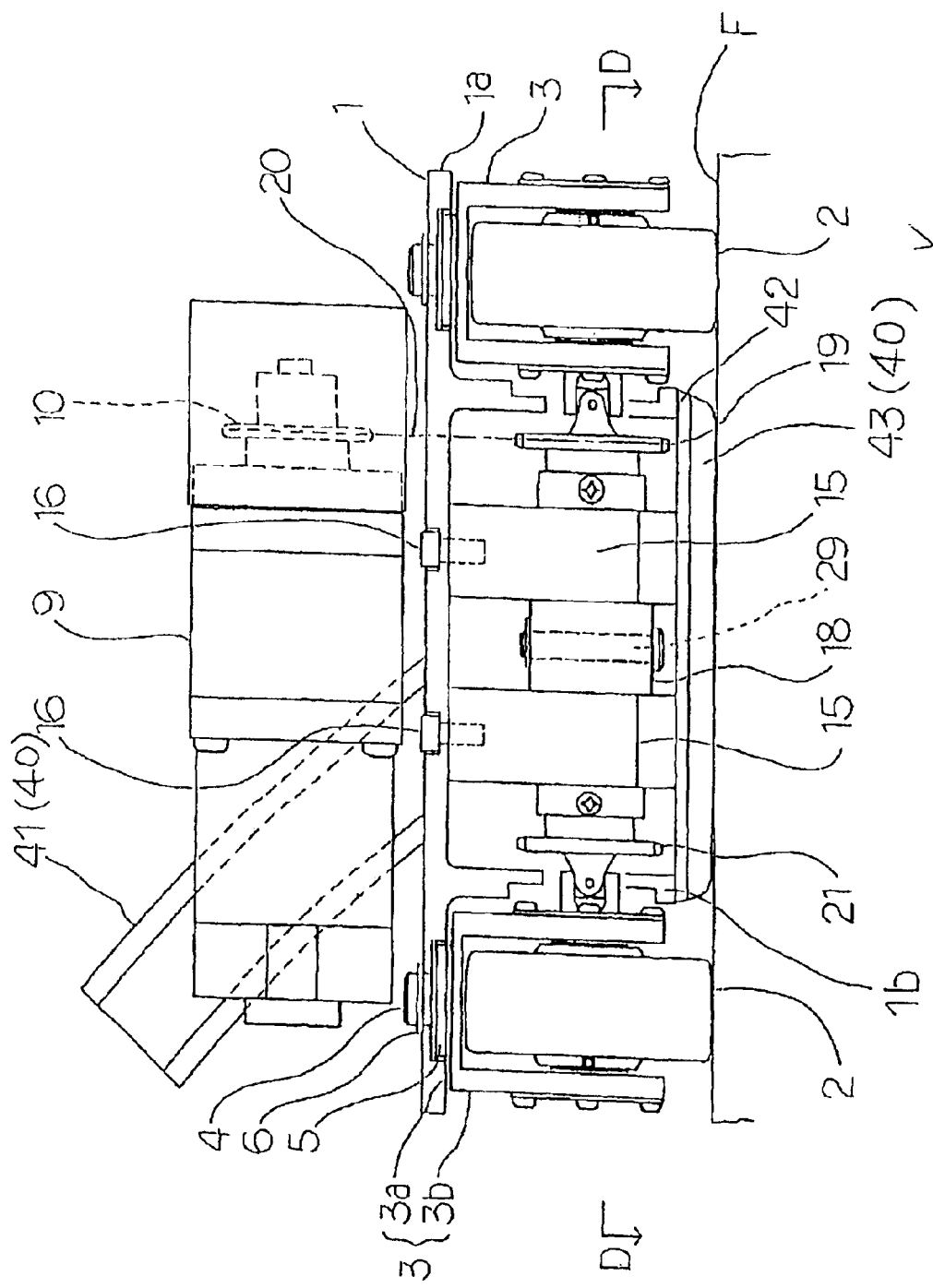
FIG. 4 is an explanatory view from the direction of arrow C in FIG. 1.

A carriage 1 is composed of a rectangular base plate 1a and rectangular frame 1b disposed in the center on the bottom face of the base plate 1a as shown in FIG. 1 and FIG. 4, and a pair of wheels 2, which functions as front wheels on left and right side, is supported by bearing units 3, respectively.

The bearing unit 3 is provided with sidewalls 3b extending downward from the respective ends of an upper plate 3a, and a back wall 3c extending downward from the back end of the upper plate 3a. A thrust pin 4 protruding from the upper face of the upper plate 3a is inserted into a bearing 5, which is fitted into a through hole formed in the carriage 1, and the end of the thrust pin 4 projecting out from the through hole is locked by a stopper ring 6.

Figure 5:
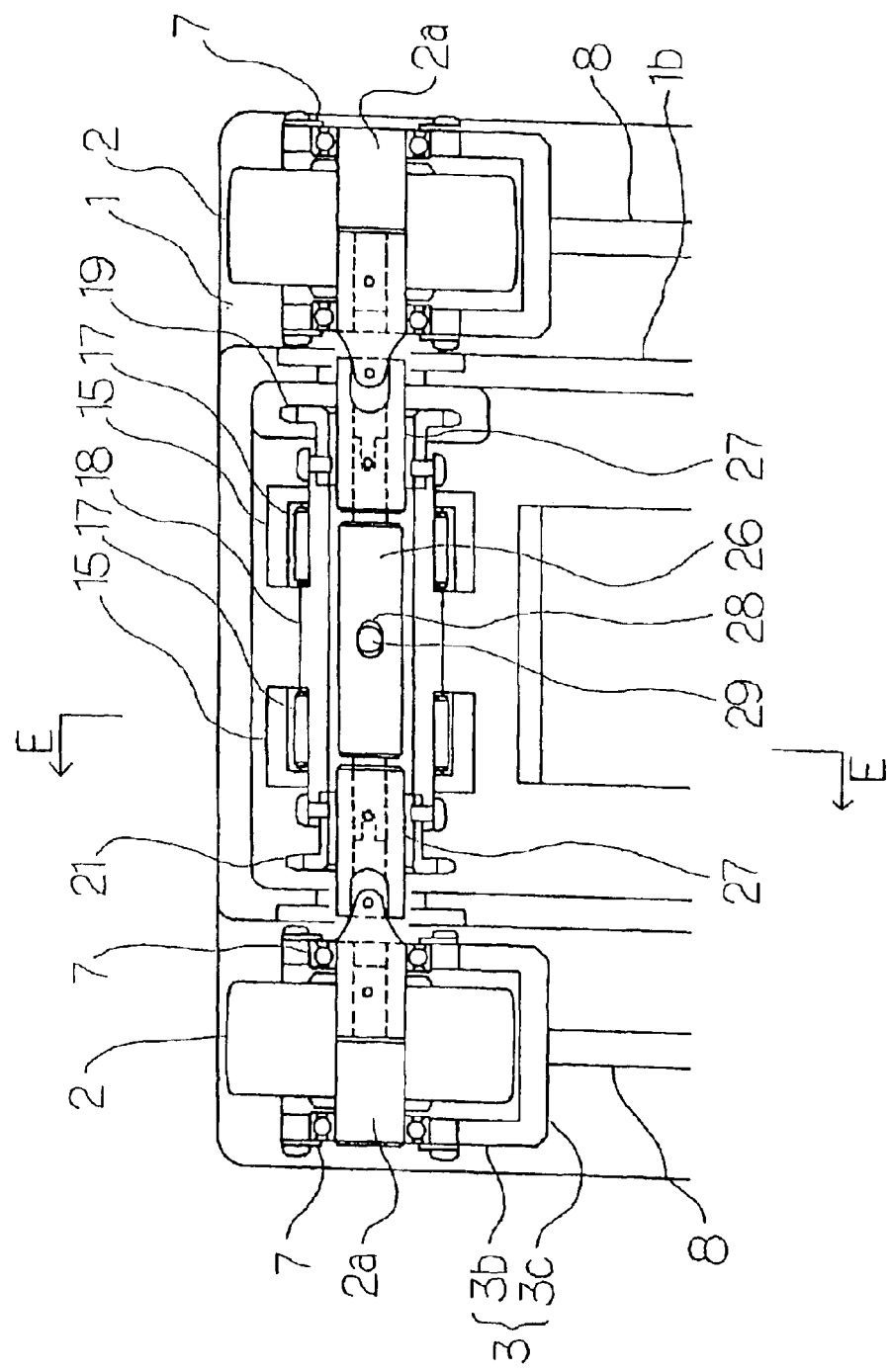
FIG. 5 is a sectional view along section lines D—D of FIG. 4.

As shown in FIG. 5, bearings 7 are fitted into holes formed through the both sidewalls 3b of the bearing unit 3, and an axle 2a of the wheel 2 is supported by these bearings 7. Accordingly, the wheels 2 are structured to rotate around the axles 2a, and so designed as to be able to change the running direction around the thrust pins 4.

The bearing unit 3 is provided with an arm bolt 8 on the back wall 3c thereof. Further, a motor 9 is mounted on the upper face of the carriage 1 as a driving source, as shown in FIG. 4, and attached with a sprocket 10 on an output shaft thereof.

Figure 2:
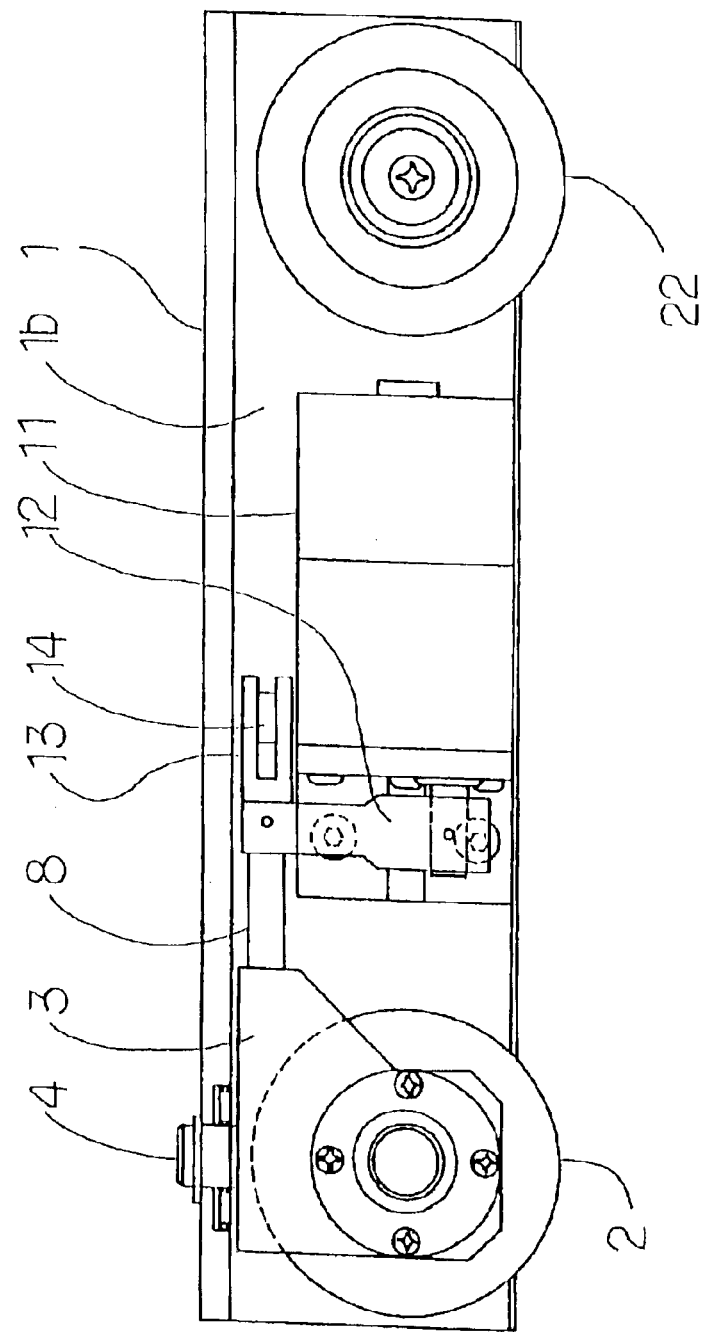
FIG. 2 is an explanatory view from the direction of arrow A in FIG. 1.
Figure 8:
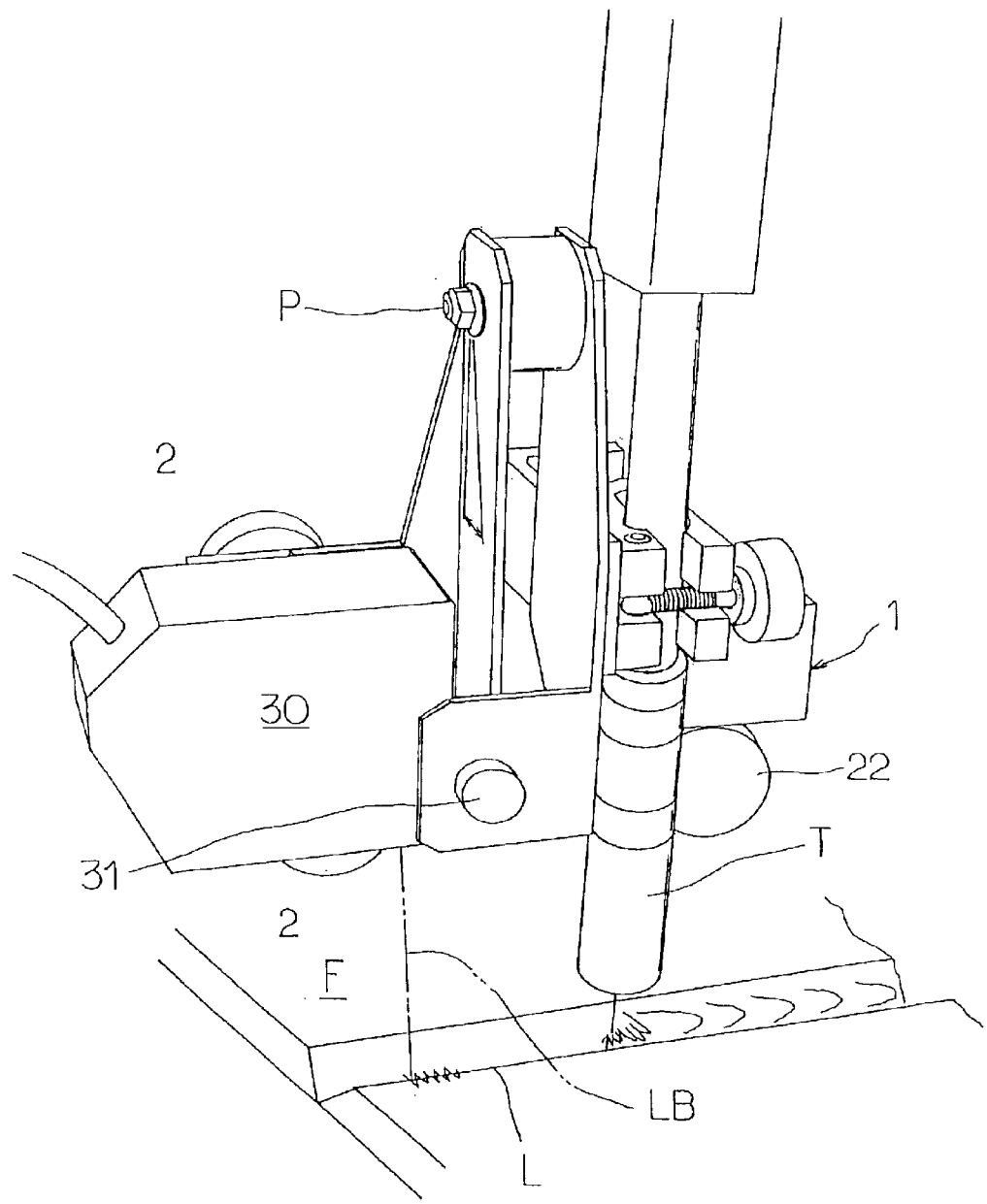
FIG. 8 is an explanatory view illustrating a state of butt welding using the tracking welder according to the embodiment of this invention.

As also shown in FIG. 8, carriage 1 is mounted with a welding torch T and a sensor 30 for detecting displacement by applying a laser beam to the welding line L, and a track-controlling motor 11 is attached on the outer wall of the frame 1b, which rotates by receiving a detection signal from the sensor 30 as shown in FIG. 2. The motor 11 fixed with a lever 12 on the output shaft thereof.

An optical axis LB of the sensor 30 is focused to the welding line L through a turning operation of a knob 31, and the welding torch T is so structured as to weave within a range shown by arrows around an axis P.

Figure 3:
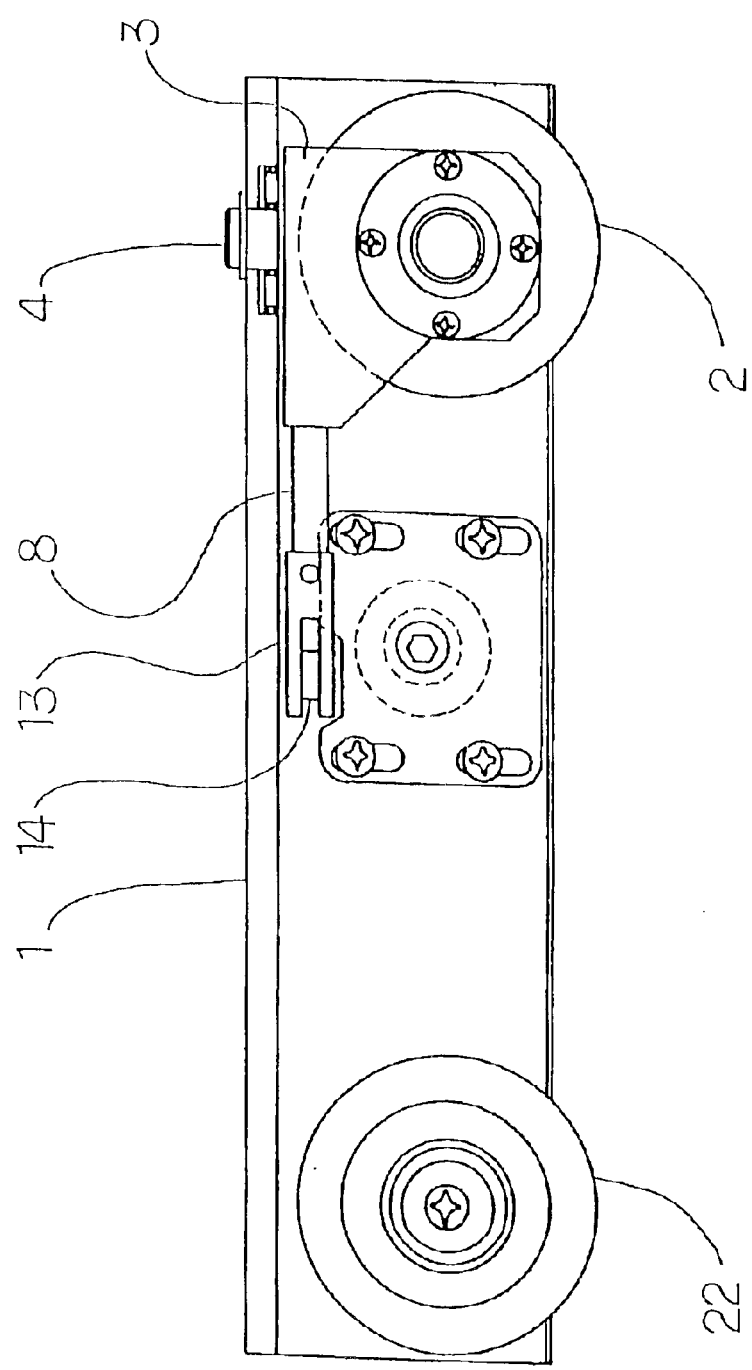
FIG. 3 is an explanatory view from the direction of arrow B in FIG. 1.

As also shown in FIG. 3, the free end of the lever 12 is engaged with the arm bolts 8 protruding from one of the bearing units 3, and the two arm bolts 8 are pivotally connected to respective ends of a connection bar 14 through forked fittings 13 secured on the free ends of the arm bolts 8.

Namely, the track-controlling motor 11 works on basis of the signal from the sensor 30, thereby swinging the lever 12 in the normal or the reverse directions, and the swing of the lever 12 is transmitted to the bearing units 3 of the left and right sides through the arm bolts 8, thereby changing the direction of the left and right side wheels 2 together with the bearing units 3 toward the left or right side from the traveling direction of the carriage 1. In this manner, the steering system is composed.

Figure 6:
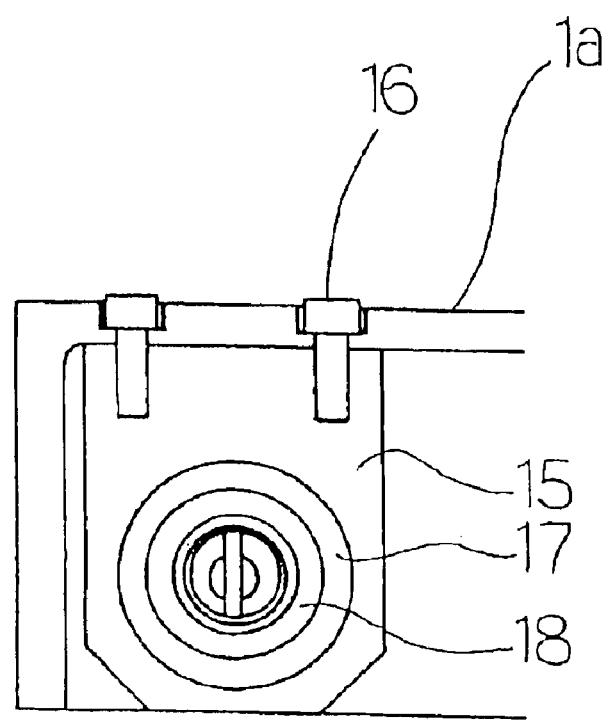
FIG. 6 is a sectional view along section lines E—E of FIG. 5.

As also shown in FIG. 6, a pair (left and right) of cylinder brackets 15 are fixed on the bottom face of the base plate 1a of the carriage 1 with bolts 16, a hollow outer cylinder 18 is rotatably supported by bearings 17 fitted into through holes of the cylinder brackets 15, and a sprocket 19 disposed at one end of the outer cylinder 18 is connected with a sprocket 10 disposed to the output shaft of the motor 9 through a chain 20.

A chain 25 is stretched between a sprocket 21 disposed at another end of the outer cylinder 18 and a sprocket 24 disposed to an axle 23 of rear wheels 22. As shown in FIG. 5, the intermediate shaft 26 disposed in the hollow of the outer cylinder 18 is connected to the axles 2a of the front wheels 2 through universal joints 27 at the respective ends thereof, and a transmission pin 29 is passed through an oval hole 28 formed in the middle of the intermediate shaft 26 and engaged to the hollow outer cylinder 18 at the both ends thereof.

That is to say, when the motor 9 starts, the rotational motion of the motor 9 is transmitted to the outer cylinder 18 through the sprocket 10, the chain 20, and the sprocket 19, the rotational motion of the outer cylinder 18 is transmitted to the intermediate shaft 26 through the transmission pin 29, whereby the front wheels 2 come to rotate and at the same time, the rear wheels 22 also come to rotate by the power transmitted to the rear axle 23 through the sprocket 21, the chain 25, and the sprocket 24, and in this way, the transmission system for driving force is composed.

In this time, the universal joint 27 is disposed between the axle 2a of the wheel 2 and the intermediate shaft 26 transmitting the power, and the universal joint 27 is fitted to the intermediate shaft 26 with a play, therefore the power of the intermediate shaft 26 is transmitted to the wheels 2 smoothly even when correcting the direction of the wheels 2 while traveling.

Furthermore, this tracking welder is provided with a suction system 40 for attracting the carriage 1 on a carriage-running face F so as to enable the carriage 1 to travel, as shown in FIG. 4.

The suction system 40 is provided with a suction sleeve 41 disposed to the carriage 1 to communicate with the inside of the frame 1b, packing 43 made of silicon rubber or so, attached on the lower end of the frame 1b through a bottom plate 42 and set in near contact with the carriage-running face F, and a vacuum pump (not shown) working as a suction source and connected with the suction sleeve 41 through a hose. The suction system 40 is designed to attract the carriage 1 so that the carriage 1 may travel on the carriage-running face F by actuating the vacuum pump and sucking air in the frame 1b of the carriage 1.

As shown in FIG. 8, in a case of carrying out butt welding of steel plates, at first, the tracking welder is placed on the running face F of the steel plates in a state of directing the front wheels 2 toward the welding direction (on the left side in FIG. 8). Then, the optical axis LB of the sensor 30 is adjusted with the welding line L by the turning operation of the knob 31, and the welding torch T is approached to the starting point of the welding.

Following suction of air in the inner part of the frame 1b of the carriage 1 to enable the carriage 1 to travel in a state of being attracted on the carriage-running face F by actuating the vacuum pump, a switch on a cover (not shown) provided on the carriage 1 is operated on to supply power to the motor 9. In this manner, the carriage 1 of the tracking welder comes to travel over the welding of the predetermined welding line L by rotating the wheels 2 at the same time of making the welding torch T to weave in the range of arrows around the axis P.

Then, when the sensor 30 on the carriage 1 detects deviation (displacement) of the present traveling route of the carriage 1 from the predetermined welding line L, the track-controlling motor 11 rotates as much as an amount corresponding to the displacement amount in response to the detection signal from the sensor 30, the lever 12 fixed to the track-controlling motor 11 presses the arm bolt 8 by the rotation of the motor 11, whereby the direction of the wheels 2 is correct according to the turn of the bearing units 3 pushed by the arm bolts 8, and thus carriage 1 of the tracking welder comes to travel always without deviating from the predetermined welding line L.

Figure 7:
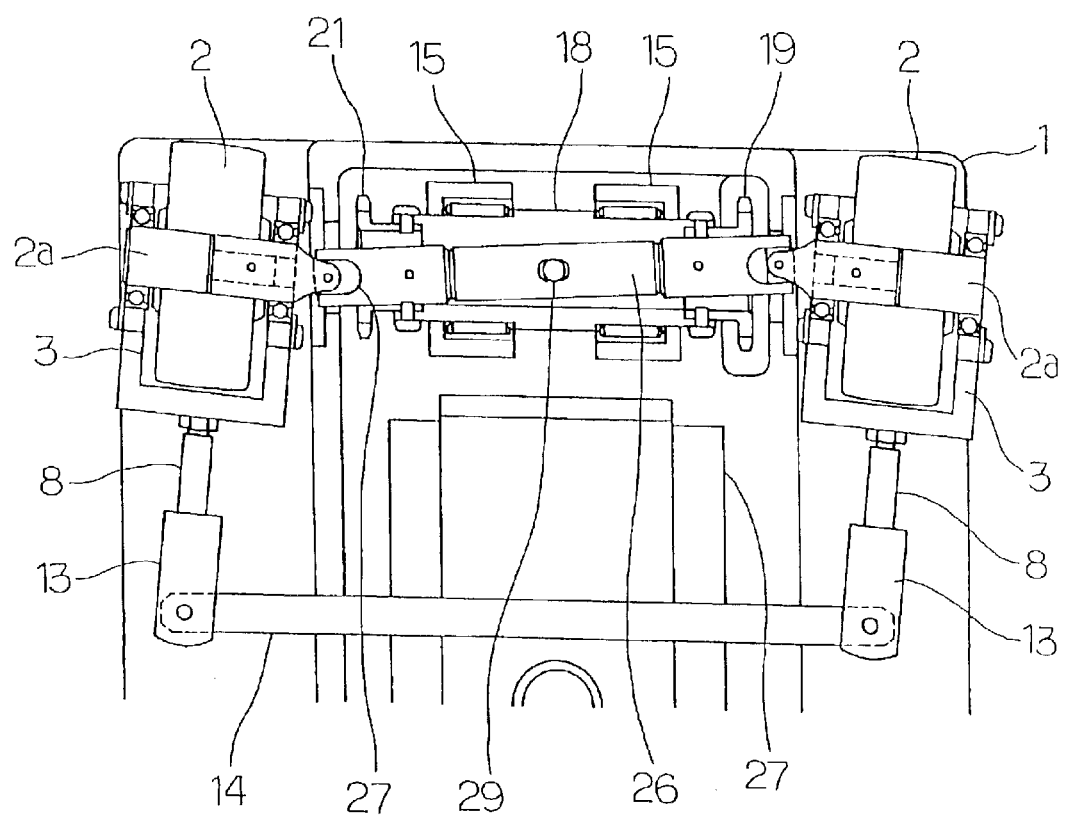
FIG. 7 is an explanatory view illustrating the action of the steering system.

Under this operation, as illustrated in FIG. 7, since the universal joint 27 is disposed between the axle 2a of the wheel 2 and the intermediate shaft 26 transmitting the power, and the universal joint 27 is fitted with the intermediate shaft 26 with the play, the intermediate shaft 26 just inclines slightly when the direction of the wheels 2 is corrected during the travel, so that it is possible to smoothly transmit the power to the wheels 2.

In addition to above, the tracking welder having the aforementioned construction may be also mounted with an equalizer system.

EXAMPLE 2

Figure 9:
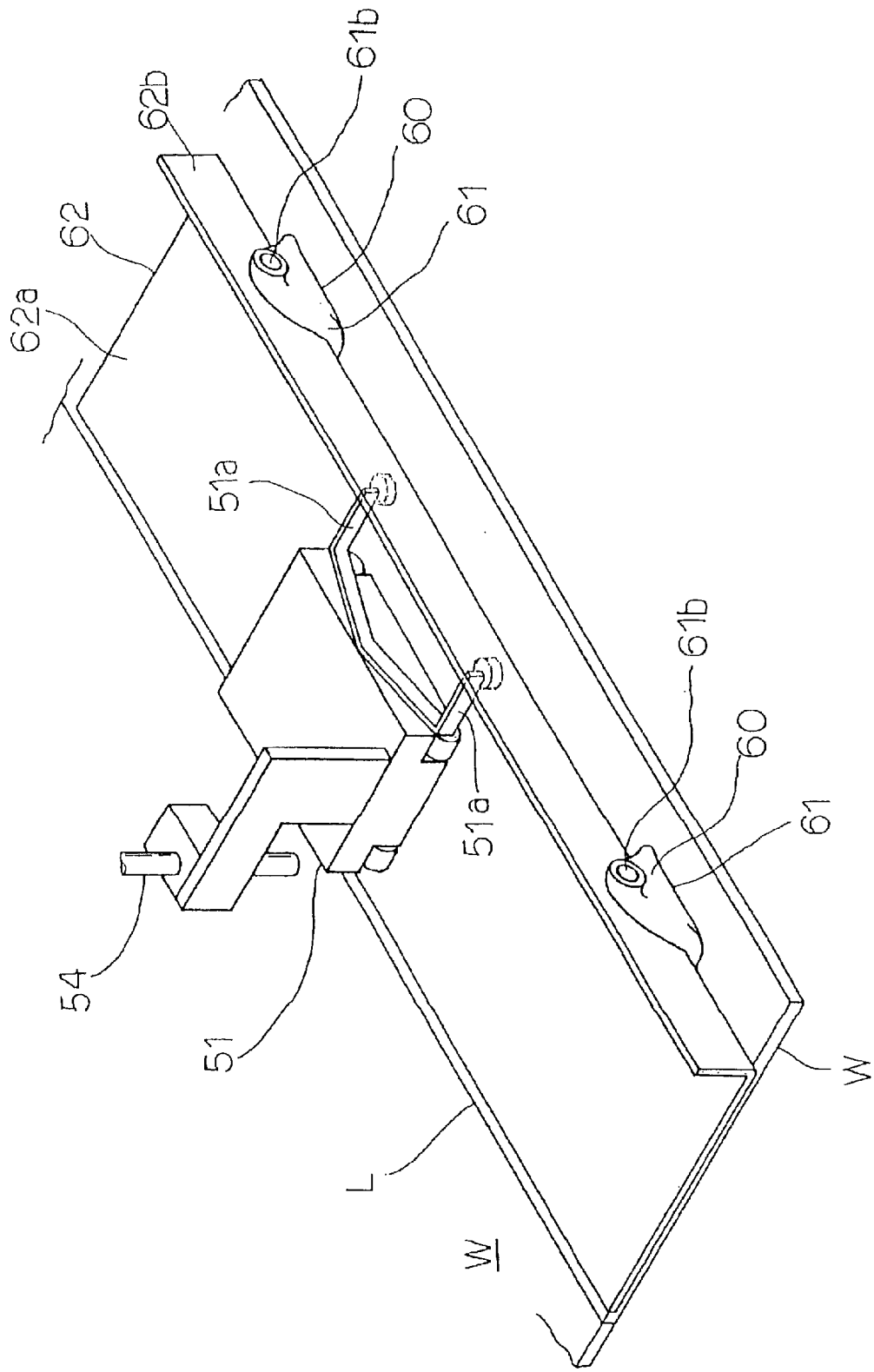
FIG. 9 is a perspective view illustrating another embodiment of the tracking welder according to this invention.
Figure 10:
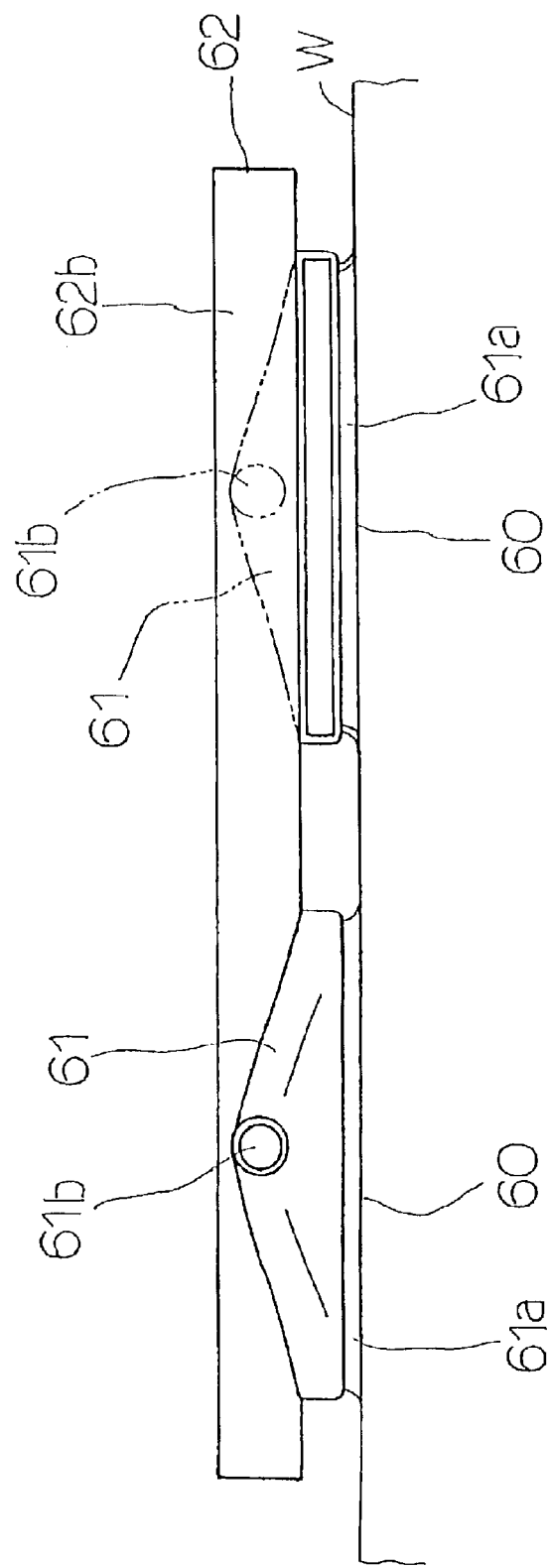
FIG. 10 is a side view of the tracking welder shown in FIG. 9.
Figure 11:
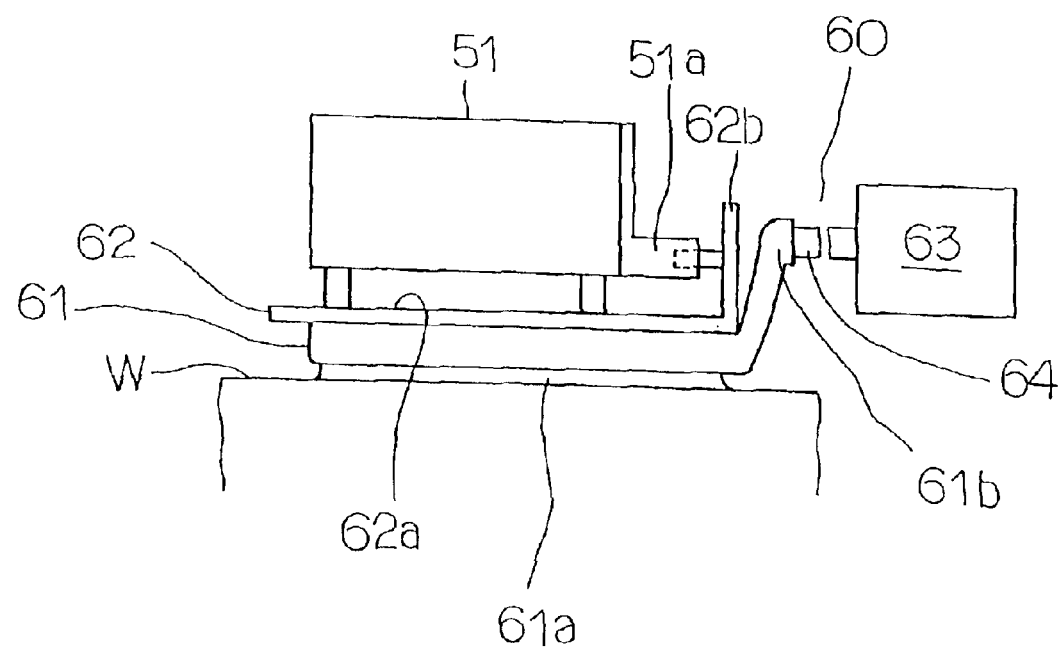
FIG. 11 is a front view of the tracking welder shown in FIG. 9.

Another embodiment of the tracking welder according to the present invention is shown in FIG. 9 to FIG. 11.

The tracking welder shown in FIG. 9 is a welding apparatus for using butt welding of works W made of non-magnetic metal, such as aluminum and stainless steel. A suction system 60 in this tracking welder, which attracts a carriage 51 mounted with a welding torch 54 toward the works W so as to enable the carriage 51 to travel, is mainly composed of a flat base 62 made of magnetic metal and provided with a carriage-running face 62a and a tracking wall 62b as a traveling route-setting means, a flexible suction cup 61 fitted on the reverse side (lower side in the figures) of the carriage-running face 62a of the base 62 in a state of directing an aperture 61a toward the opposite direction of the carriage-running face 62a, a suction pump (suction source) 63 connected with a suction port 61b of suction cup 61 through a hose 64 to such the air in the suction cup 61, and a magnet (not shown) disposed on the carriage 51 for preventing the carriage 51 from falling as shown in FIG. 10 and FIG. 11.

The suction system 60 is so designed as to enable the base 62 to be attached not only on the upper face of the works W, but also on the side face and the bottom face of the works W by actuating the suction pump 63 and sucking air in the suction cup 61, and the other hand, as to enable the base 62 to be easily detached from the works W by stopping the operation of the suction pump 63 and opening the inside of the suction cup 61 into the atmosphere.

In this case, the carriage 51 is installed with a pair of the tracking arms 51a on the side face thereof, and so structured as to travel along the predetermined running route by setting the carriage 51 to slide-contact the tracking arms 51a with the tracking wall 62b of the base 62 in a state of attaching the base 62 to the works W so that the tracking wall 2b positioned at the side edge of the base 62 may be situated along the butt welding line L of the works W.

In this tracking welder, the flat base 62 made of magnetic metal and possible to set the traveling route of the carriage 51 is adsorbed on the works W, and the setting of the base 62 against the works W is completed by actuating the suction pump 63 of the suction system 60 and sucking air in the suction cup 61 after placing the base 62 on the works W so as to situate the tracking wall 62b along the butt welding line L of the works W. On the other hand, the adsorption state of the base 62 on the works W is cancelled and the withdrawal of the base 62 becomes possible by stopping the operation of the suction pump 63 of the suction system 60, and the respective operation in arrangements and withdrawals is completed easily in a short time, accordingly workability of the butt welding comes to be improved remarkably.

Further in this welder, the traveling route of the carriage 51 is made by the tracking wall 62b of the base 62, therefore the setting of the traveling route of the carriage 51 is done with the simple construction.

EXAMPLE 3

Figure 12:
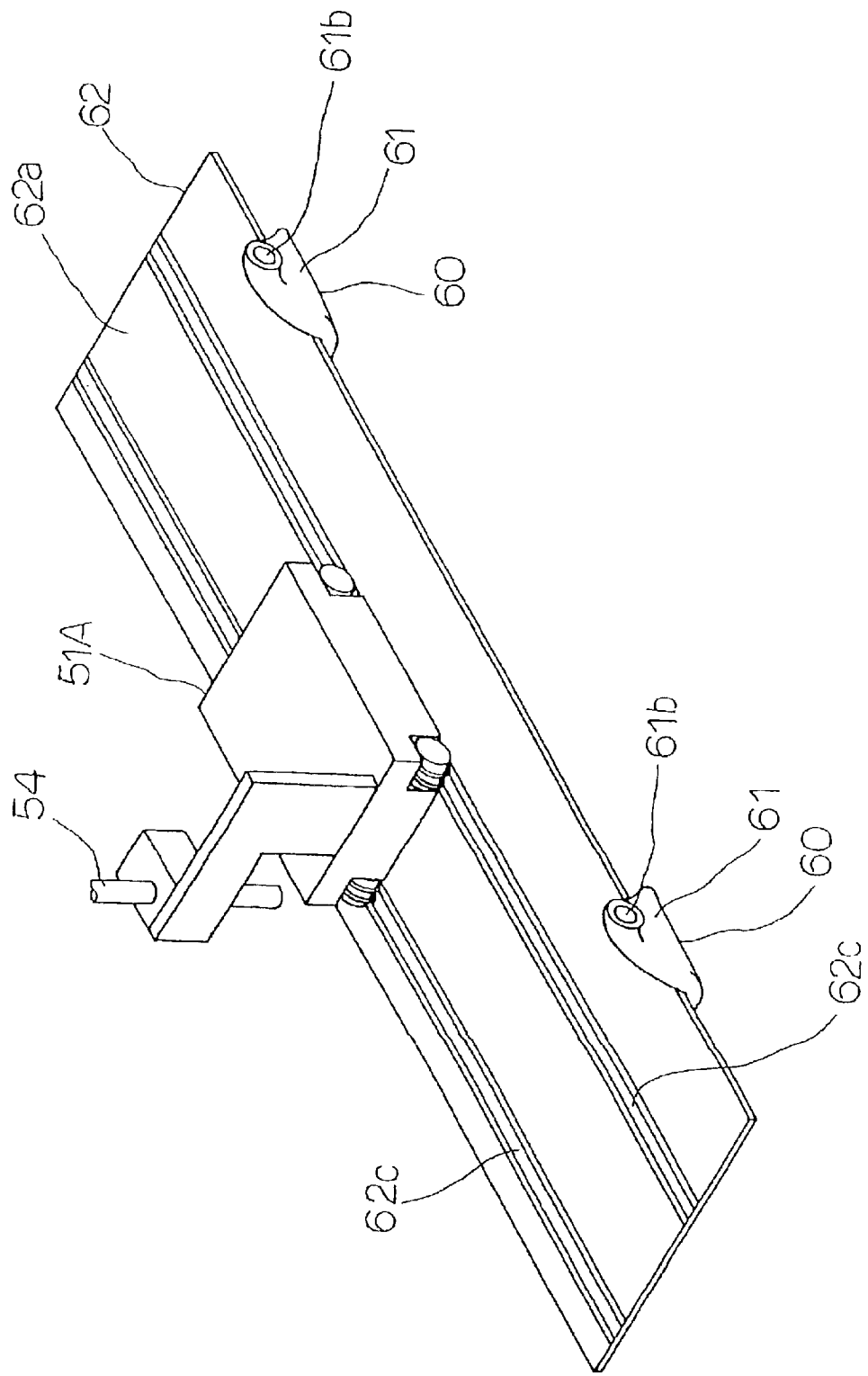
FIG. 12 is a perspective view illustrating the other embodiments of the tracking welder according to this invention.

The other embodiment of the tracking welder according to the present invention is shown in FIG. 12. There are differences between this welder and the welder according to the preceding embodiment (Example 2) in the point that the base 62 is formed with rails 62c as a traveling route-setting means so as to run a carriage 51A along the predetermined traveling route by these rails 62c as shown in FIG. 12, and the tracking welder according to this embodiment is the same as the welder according to the preceding embodiment excepting the construction as mentioned above.

Therefore, also in this welder, the respective operation in arrangements and withdrawals is completed easily in a short time, accordingly workability of the butt welding comes to be improved remarkably, additionally the setting of the traveling route of the carriage 51A is done with the further simple construction since the traveling route of the carriage 51 can be set by the rails 62c formed on the base 62.

EXAMPLE 4

Figure 13:
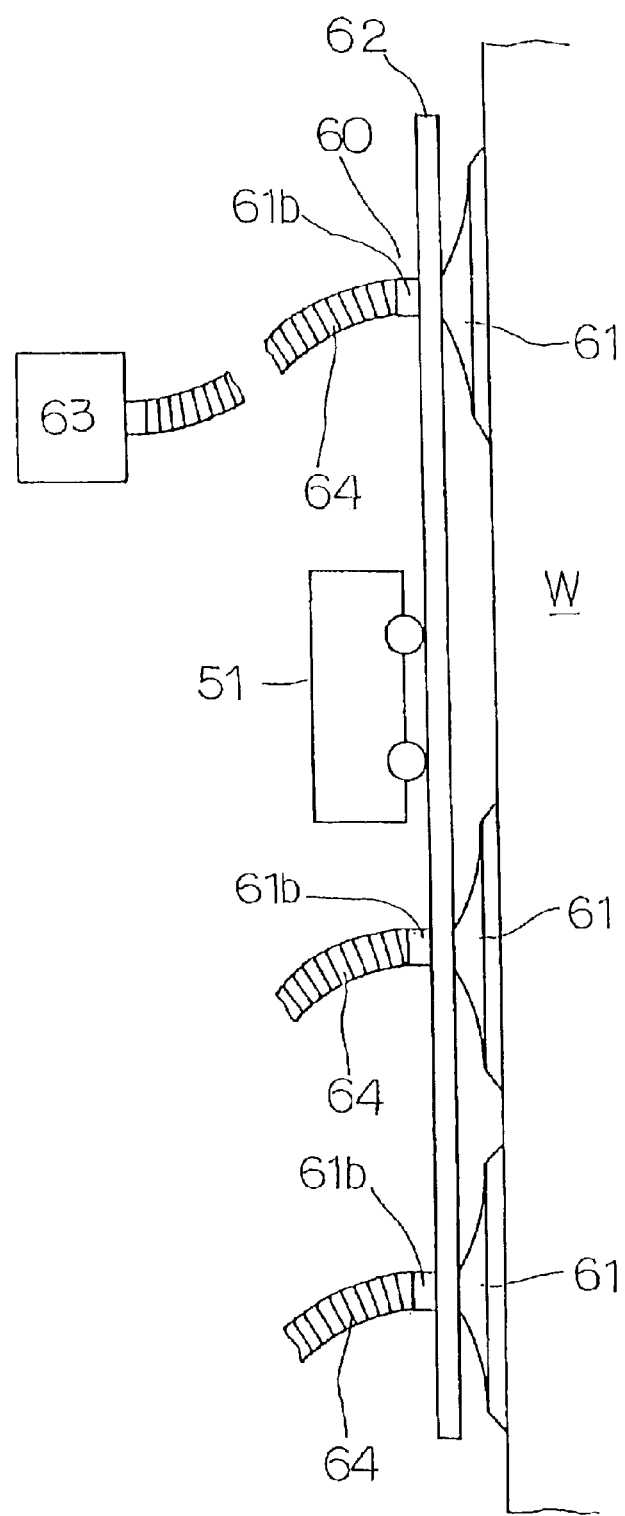
FIG. 13 is a side view illustrating other embodiment of the tracking welder according to this invention.
Figure 14:
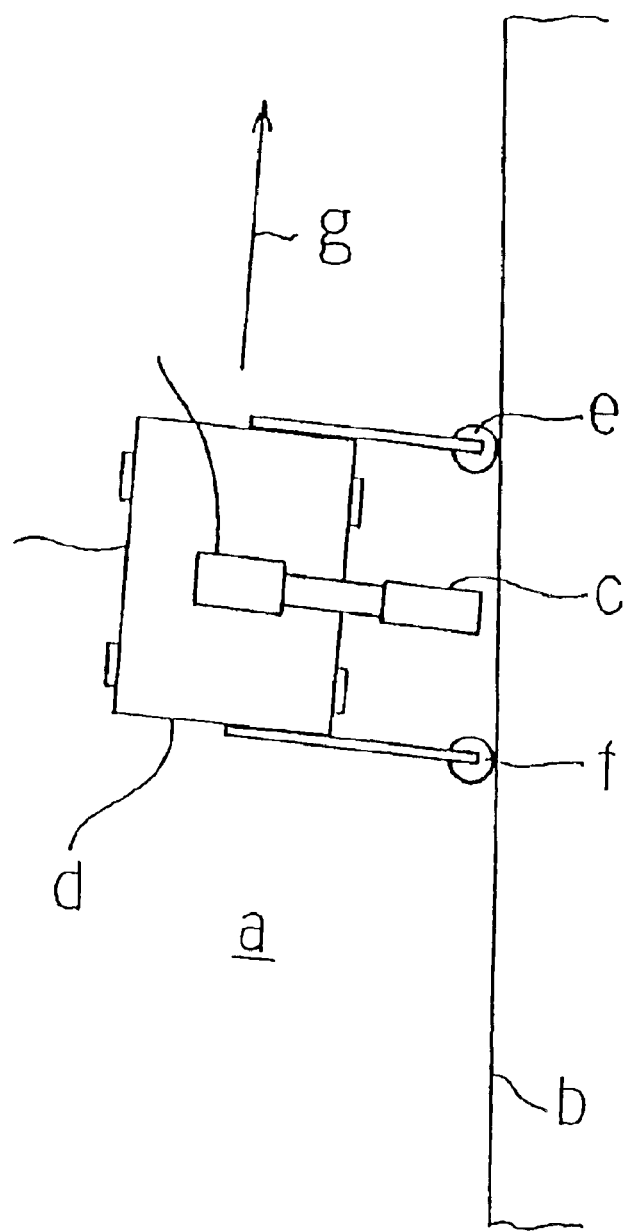
FIG. 14 is a top view illustrating the action of the conventional tracking welder.

FIG. 13 illustrates the other embodiment of the tracking welder according to the present invention. There are differences between this welder and the welders according to the preceding embodiments (Example 2 and 3) in the point that the suction port 61b of the suction cup 61 in the suction system 60 is disposed on the carriage-running face 62a of the base 62 in a position where the carriage 51 may travel without hindrance and the suction port 61b and the suction pump 63 are connected through the hose as shown in FIG. 13, and the tracking welder according to this embodiment is the same as the welders according to the preceding embodiments excepting the construction as mentioned above.

Also in this welder, the respective operation in arrangements and withdrawals is completed easily in a short time.

In the aforementioned examples shown in FIG. 9 to FIG. 12, the cases are illustrated where the tracking welder according to this invention is set on the upper surface of the work W, however the present invention is not limited merely to such the examples and it is also set the welder on the side face as shown in FIG. 13 (Example 4), or on the bottom face of the work W.

INDUSTRIAL APPLICABILITY

As described above, in the tracking welder according to the present invention, providing the aforementioned construction, an excellent effect can be obtained in that it is possible to carry out various kinds of automatic welding, including butt welding of steel plates with each other, without being limited only in fillet welding between the steel plate and the web plate erected on this steel plate unlike the conventional tracking welder.

Also, in a preferred embodiment of the tracking welder according to the present invention, providing the aforementioned construction, the traveling direction is not limited in just one direction, but it is possible to apply welding from the reverse direction. In another preferred embodiment of the tracking welder according to the present invention, having the aforementioned construction, it is possible to smoothly perform welding along the predetermined route without causing unnatural slipping to the wheels while the carriage is traveling.

Furthermore, in the other preferred embodiment of the tracking welder according to the present invention, providing the aforementioned construction, it comes further to perform, for example, butt welding of the works made of non-magnetic metal, and it becomes possible to realize enlargement of applicable fields of this tracking welder.

Moreover, in the other preferred embodiment of the tracking welder according to the present invention, it is possible to carry out the respective operation in arrangements and withdrawals simply in a short time in butt welding of the works made of non-magnetic metal, and consequently, possible to realize remarkable improvement of the workability of the butt welding. Further in the other preferred embodiment of the tracking welder according to the present invention, it is possible to set the running route of the welding carriage without complicating the construction, in addition to the same effects obtained in the aforementioned tracking welders.

What is claimed is:

1. A tracking welder for automatically welding works along a predetermined welding line, comprising:
    a carriage provided with left and right side wheels rotatably supported respectively through a pair of bearing units pivotally mounted thereon;
    a driving source mounted on the carriage for driving said carriage;
    a transmission system mounted on the carriage for transmitting a rotational motion of said driving source to said left and right side wheels;

a welding torch mounted on the carriage;

a sensor mounted on the carriage for detecting the welding line;

a track-controlling motor mounted on the carriage and rotating in forward and backward directions in response to a detection signal from said sensor; and a steering system mounted on the carriage for turning said bearing units as much as an amount corresponding to a rotational amount of said track-controlling motor;

wherein said transmission system is provided with:

a hollow outer cylinder rotatably supported on said carriage to be transmitted with the rotational motion of the driving source;

an intermediate shaft disposed in the hollow of said outer cylinder and connected with axles of said wheels through universal joints at both ends of the outer cylinder; and a transmission pin passing through an oval hole formed in said intermediate shaft and engaged to said outer cylinder.

2. A tracking welder as set forth in claim 1, wherein said steering system is provided with:

a pair of arm bolts protruding from outer faces of said respective bearing units;

a connection bar pivotally connected with said one pair of arm bolts at both ends thereof; and a lever secured on an output shaft of said track-controlling motor and engaging with one of said arm bolts at a free end thereof; and wherein said welder is further provided with a suction system for attracting the carriage toward a carriage-running face so as to enable the carriage to travel on the running face.

3. A tracking welder for automatically welding works made of non-magnetic metal along a predetermined welding line, comprising:

a carriage traveling in a state of holding a welding torch; and a suction system for attracting said carriage toward the works so as to enable the carriage to travel, wherein said suction system is provided with a flat base made of magnetic metal, and having a carriage-running face and a traveling route-setting means;

a flexible suction cup formed with an aperture and fitted on said base on a side reverse from the carriage-running face in a state of directing the aperture toward an opposite direction of the carriage-running face;

a suction source for sucking air in said suction cup; and a magnet is disposed on the carriage for preventing the carriage to fall.

4. A tracking welder as set forth in claim 3, wherein said base is provided with a tracking wall or a rail thereonto as said traveling route-setting means.

* * * * *

UNITED STATES PATENT AND TRADEMARK OFFICE
CERTIFICATE OF CORRECTION

PATENT NO. : 6,917,013 B2
DATED : July 12, 2005
INVENTOR(S) : Akihiro Kondo

It is certified that error appears in the above-identified patent and that said Letters Patent is hereby corrected as shown below:

Title page,
Item [56], References Cited, FOREIGN PATENT DOCUMENTS, please add as follows:
-- JAPAN       2001-135442       May 2, 2001 --.

Signed and Sealed this

Twentieth Day of September, 2005

JON W. DUDAS
*Director of the United States Patent and Trademark Office*